US009948758B1

(12) United States Patent
Choi et al.

(10) Patent No.: US 9,948,758 B1
(45) Date of Patent: Apr. 17, 2018

(54) CALLING DEVICE FOR CALLING DRIVER OF VEHICLE BY USING LOW-POWER WIDE-AREA NETWORK AND CALLING METHOD THEREOF

(71) Applicants: CONTELA, INC., Seongnam-si (KR); Thinkl Inc., Seongnam-si (KR)

(72) Inventors: Sung Kuk Choi, Yongin-si (KR); Byoung Wook Park, Gwacheon-si (KR)

(73) Assignees: CONTELA, INC., Seongnam-si (KR); THINKI INC., Seongnam-si (KR)

( * ) Notice: Subject to any disclaimer, the term of this patent is extended or adjusted under 35 U.S.C. 154(b) by 0 days.

(21) Appl. No.: 15/617,325

(22) Filed: Jun. 8, 2017

(30) Foreign Application Priority Data

May 15, 2017 (KR) .................. 10-2017-0059842

(51) Int. Cl.
| H04M 3/42 | (2006.01) |
| H04M 1/57 | (2006.01) |
| B60K 35/00 | (2006.01) |

(52) U.S. Cl.
CPC ............ H04M 1/575 (2013.01); B60K 35/00 (2013.01); H04M 3/42042 (2013.01); *B60K 2350/106* (2013.01); *B60K 2350/1076* (2013.01); *B60K 2350/921* (2013.01)

(58) Field of Classification Search
CPC ...... H04B 1/0475; H04B 1/1036; H04B 1/44; H04B 2001/0408; H04B 2203/5433; H04B 3/546; H04B 5/02; H04B 5/04; H04B 5/0031; H04B 5/0043; H04W 52/0277; H04W 52/028; H04W 88/02; H04W 88/16; H04W 4/001; H04W 4/005; H04W 4/008; H04W 12/08; H04W 12/10; H04W 52/0254; H04W 84/12; H04W 84/18

See application file for complete search history.

(56) References Cited

U.S. PATENT DOCUMENTS

| 5,949,776 | A | * | 9/1999 | Mahany | ............. G06K 7/10702 370/311 |
| 2013/0097240 | A1 | * | 4/2013 | Ling | ...................... G06F 1/3209 709/204 |
| 2016/0240074 | A1 | * | 8/2016 | Probin | ................... G08B 25/10 |
| 2016/0345265 | A1 | * | 11/2016 | Lee | ................... H04W 52/0235 |

FOREIGN PATENT DOCUMENTS

| KR | 10-0915859 B1 | 8/2009 |
| KR | 10-2015-0081188 A | 7/2015 |
| KR | 10-2016-0132272 A | 11/2016 |

* cited by examiner

*Primary Examiner* — Nimesh Patel
(74) *Attorney, Agent, or Firm* — Stein IP, LLC

(57) ABSTRACT

A calling device for calling and communicating with a driver of a vehicle with a low power by using a Low Power Wide Area Network (LPWAN) such as a LoRa communication network and a calling method thereof are disclosed. The calling device according to the invention may be installed in a vehicle and transmit/receive data to/from a management server through the LPWAN. The calling device transmits a calling message to a driver terminal by recognizing a user's tapping, touching, etc., and when the driver confirms the calling message, display to the caller that the driver confirms the calling message. In addition, the calling device also allows the caller to call the driver directly by displaying the driver phone number if the driver does not confirm the calling message in time.

6 Claims, 4 Drawing Sheets

CALLING DEVICE FOR CALLING DRIVER OF VEHICLE BY USING LOW-POWER WIDE-AREA NETWORK AND CALLING METHOD THEREOF

BACKGROUND OF THE INVENTION

1. Field of the Invention

The present invention relates to a calling device for calling and communicating with a driver of a vehicle through low power by using a low-power wide area communication network and displaying the telephone number of the driver if necessary and a calling method thereof.

2. Description of the Related Art

Low Power Wide Area Network (LPWAN) is recently adopted as a wireless network for Internet of Things (IoT). Since a network platform for IoT always uses data but is required to operate with a battery, it needs to be able for low-power transmission, and since it uses a small amount of data while using data constantly, super high speed is not required, and since its high cost makes it less economical, its usage is impossible. LPWAN is receiving attention as a wireless network for IoT as a solution to such a demand. LPWAN, as a fairly large coverage network in IoT, includes commercialized technologies such as LoRa, Sigfox, Ingenu, LTE-M, and NB-IOT.

LoRa, for example, has advantages of being capable of low-power communication and having a fairly wide coverage of up to 20 km. Sigfox has a coverage of 10 Km within a city and has a coverage of up to 30 Km outside a city. LTE-Machine-type Communications (MTC) or LTE-M, Narrowband (NB) LTE-M, and NB IoT are recently announced standards for LTE technology based on 3rd Generation Partnership Project (3GPP) release 12 and 13, and Power Saving Mode (PSM), and the like are applied thereto.

On the other hand, when parking a vehicle, a vehicle driver displays his/her telephone number at a position where it is possible to check the telephone number outside the vehicle for several purposes. A vehicle driver mainly put a paper, a plastic pad, a fluorescent panel, or a kind of LED panel with a recorded phone number underneath the front window of the vehicle. However, such a method is very wearisome for drivers because the telephone number is placed to be always exposed so that the telephone number of a driver may be used for a purpose other than the original purpose such as moving a vehicle's parked place. In fact, while this phone number is exposed, a lot of advertising spam messages are provided. Despite these inconveniences, drivers have no choice but to leave the phone number on the vehicle unless they park in their own private parking area or an area where there is no need for moving a parked place.

SUMMARY OF THE INVENTION

In order to achieve the above object, a driver calling device according to the invention may be installed in a vehicle and may transmit/receive data to/from a management server through a Low Power Wide Area Network (LPWAN). In addition to the LoRa network, LPWAN is also available in Sigfox, Ingenu, LTE-M, and NB-IOT.

The calling device of the invention includes a calling detection sensor installed at one side of the vehicle to detect an operation of a caller, a display unit installed at the inside of a glass window of the vehicle to display various information to the caller, an LPWAN interface connecting to the LPWAN through a wireless channel according to the LPWAN protocol, a calling detection unit configured to receive a driver calling command from the caller by using a detection signal of the calling detection sensor unit, and a calling control unit configured to transmit a calling message including a calling device identification number to the management server according to the calling command through the LPWAN interface and request the management server to deliver the calling message to the driver and display that the driver is being called on the display unit. When receiving a calling confirmation message notifying that a driver confirms the calling message from the management server, the calling control unit may display that the driver confirms the calling on the display unit.

For example, a calling detection sensor unit may detect an operation of a caller by including an impact detection sensor for detecting a vehicle vibration according to tapping a specific area of the vehicle or a capacitive sensor for detecting a finger or palm of the caller contacting a specific area of the vehicle.

According to yet another embodiment, the driver terminal includes a network interface connected to the management server via a separate network other than the LPWAN network, and a dedicated messaging application for displaying the calling message received from the management server and transmitting the calling confirmation message to the management server when an operation for confirming the calling message is inputted from the driver.

The invention also relates to a vehicle driver calling method of the driver calling device. The method of the invention includes (a) receiving, by a calling detection unit of the calling device, a driver calling command from a caller by using a calling detection sensor installed at one side of the vehicle to detect an operation of the caller, (b) adding, by a calling control unit of the calling device, a calling device identification number to the calling command to request the management server to transmit a calling message to the driver through the LoRa network, and displaying that the driver is being called through a display unit attached to the inside of a glass window of the vehicle, (c) receiving, by the calling control unit, a calling confirmation message corresponding to the request of step (b) from the management server and displaying that the driver confirms the calling through the display unit, wherein the calling confirmation message is generated when the management server transmits the calling message to a driver terminal mapping to the calling device identification number and the driver confirms the calling message, and (d) if the calling control unit does not receive the calling confirmation message from the management server in correspondence to the request of step (b) within a predetermined time, displaying a pre-stored driver phone number on the display unit.

DETAILED DESCRIPTION OF THE EXEMPLARY EMBODIMENTS

Hereinafter, the invention will be described in more detail with reference to the drawings.

Figure 1:
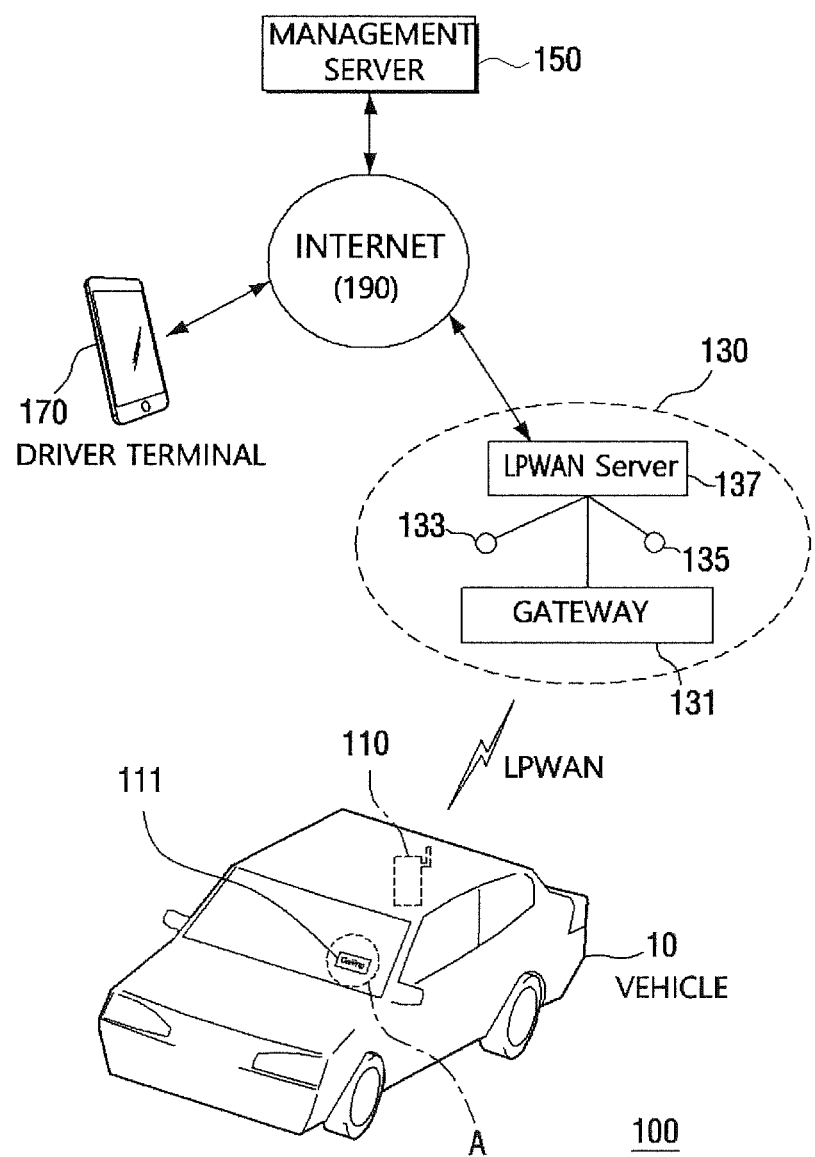
FIG. 1 is a structural diagram of a calling system of the invention.
Figure 2:
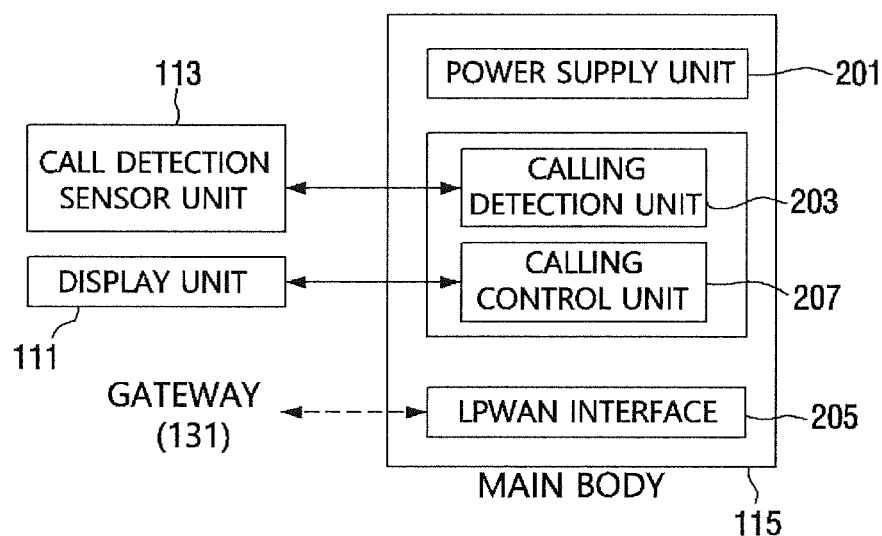
FIG. 2 is a block diagram of a calling device of the invention.

Referring to FIGS. 1 and 2, a calling system 100 of the invention includes a calling device 110 installed in a vehicle 10, an LPWAN 130, a management server 150, a driver terminal 170, and an Internet 190. Hereinafter, although a LoRa network will be described as an example of the LPWAN 130, networks such as Sigfox, Ingenu, LTE-M, and NB-IOT corresponding to the LPWAN 130 may also be used.

<LPWAN 130>

The LPWAN 130 includes a plurality of gateways 131, 133, and 135 and an LPWAN server 137 to which the plurality of gateways 131, 133, and 135 are connected, and provides a connection between the calling device 110 and the management server 150. In addition, the connection between the plurality of gateways 131, 133, and 135 and the LPWAN server 137 uses a separate interface different from the LPWAN, for example, a mobile communication Ethernet (e.g., 3G Ethernet) instead of an LPWAN protocol (e.g., LoRaWAN).

In addition, the LPWAN server 137, the management server 150, and the driver terminal 170 are interconnected through the Internet 190.

<Driver Terminal 170>

First, the driver terminal 170 may be connected to the management server 150 through the Internet 190 to control the operation of the calling device 110. Accordingly, the driver terminal 170 includes a network interface capable of connecting to the Internet 190. Moreover, both the driver terminal 170 and the calling device 110 belong to the area of the driver but the driver terminal 170 may not directly control the calling device 110 and should go through the management server 150. This is to minimize the system resources by the calling device 110 having no other network means and to reduce the power consumption of the calling device 110, network maintenance cost, and other equipment cost by minimizing the system resources.

In addition, the driver terminal 170 displays a 'calling message' transmitted by the management server 150 on a display unit (not shown) so that a driver may check the 'calling message', and when confirming the paging message, the driver transmits the 'calling message' to the server 150 automatically. For such an operation, the driver terminal 170, as a mobile phone such as a smart phone, may be provided with a dedicated messaging application (or software) for the calling system 100 of the invention.

The dedicated messaging application displays the calling message of the management server 150 to a user and then, the user automatically transmits a calling confirmation message to the management server 150 when the user performs a message confirmation operation such as opening or closing a message window in response to the calling message.

In another method, the driver terminal 170 may be a dedicated terminal for the calling system 100 of the invention capable of performing the application function.

<Management Server 150>

The management server 150 entirely operates a driver calling service by the calling device 110 of the invention and registers and manages the driver for its operation. Through the driver registration, the management server 150 stores and manages a calling device identification number and driver information by matching them each other. Here, the driver information includes information (e.g., a telephone number, a MAC address, etc.) of the driver terminal 170, a login ID, and a password.

Upon receiving the 'calling message' from the calling device 110, the management server 150 confirms the information on the driver terminal 170 of the driver's vehicle by using the calling device identification number included in the calling message, and transmits the calling message to the confirmed driver terminal 170. If the messaging application is installed in the driver terminal 170, the management server 150 may transmit the calling message in the form of a general data packet.

<Calling Device 110>

The calling device 110 is installed inside the vehicle 10 and includes a display unit 111, a calling detection sensor unit 113, and a main body 115.

The display unit 111 displays information provided by a calling control unit 207 of the main body 115 to a caller. The display unit 111 is installed inside the window of the vehicle 10 so that the caller may recognize a message. Although it is shown in FIG. 2 that the display unit 111 is separately provided from the main body 115 and is connected to the main body 115 through a cable or the like, the display unit 111 may be mounted on the main body 115.

The display unit 111 may be any type of display means. However, since the invention is characterized in minimizing power consumption, information displayed to a caller is only a 'calling' message, a 'driver calling confirmation' message, and a driver telephone number, it is enough to be able to simply display several numbers and alphabets.

The calling detection sensor unit 113 generates a 'calling command' together with a calling detection unit 203 of the main body 115 as a means for a caller to input a calling command for calling a driver.

Since it is difficult to provide an input means such as a keypad on the vehicle, it is appropriate to recognize a corresponding operation as a calling command when a caller provides an operation such as touching or tapping the vehicle. Thus, the calling detection sensor unit 113 includes a sensor for detecting that the caller is hitting or touching the vehicle 10. For example, the calling detection sensor unit 113 may be an impact detection sensor for sensing the vibration of a specific area A of the vehicle 10, or a capacitive sensor for sensing a contact of the caller's finger or palm contacting the specific area A. Therefore, the calling detection sensor unit 113 may be installed in the specific area A of the outer surface of the vehicle 10 that the caller is able to tap or touch. The calling detection sensor unit 113 provides the calling detection unit 203 with a detection signal obtained by sensing a user's operation.

The main body 115 is installed inside the vehicle 10 and connected to the display unit 111 and the calling detection sensor unit 113 and operates and is also connected to a gateway 131 of the LPWAN network through a wireless channel. The main body 115 includes a power supply unit 201, the calling detection unit 203, the LPWAN interface 205, and the calling control unit 207 as an internal configuration.

The power supply unit 201 provides a DC operation power for operation of the calling device 110. The power supply unit 201 may use an internal battery. Since the calling device 110 of the invention is characterized in realizing low-power consumption by using the LPWAN network, power may be supplied for a considerably long time even if the internal battery is used. In another method, the power supply unit 201 may supply an operation power by receiving the DC power of the vehicle battery (not shown) through the fuse box (not shown) of the vehicle 10.

The calling detection unit 203 receives a 'driver calling command' for calling the driver from a caller (i.e., a third party) by using the calling detection sensor unit 113. The driver calling command may be inputted in various ways depending on a type of the calling detection sensor unit 113.

For example, if the calling detection sensor unit 113 is an impact detection sensor that detects the vibration of the specific area A, the calling detection unit 203 uses a detection signal provided by the calling detection sensor unit 113 to recognize a calling command. A caller may input a calling command by tapping the specific area A of the vehicle. In the case of using an impact detection sensor, in order to differentiate another type of contact (or impact) such as rain from the contact of a caller, the calling detection unit 203 may remove noise such as a detection signal inputted at a predetermined interval that is greater than a predetermined size.

In another method, a caller may input a calling command by touching the specific area A of the vehicle with a finger or a palm. In this case, the calling detection sensor unit 113 may use a capacitive sensor that detects finger or palm contact of the specific area A, and when the detection signal of the calling detection sensor unit 113 is continuous for more than a predetermined time, the calling detection unit 203 may detect it as a calling command.

Here, the specific area A may be anywhere on the outer surface of the vehicle. Considering that it is common for drivers to display the telephone number on a lower portion of the windshield in front of the driver's seat or the passenger's seat, a certain area selected from the windshield in front of the driver's seat or the passenger's seat or a side window may be defined as the specific area A. On the other hand, the specific area A may be displayed on the display unit 111 to allow the calling device to recognize the specific area A, or may be attached to a window by using a sticker.

The LPWAN interface 205 is a communication module including an antenna (not shown) and communicating with the gateway 131 through a wireless channel according to the LPWAN (e.g., LoRa) protocol. The calling device 110 is connected to the management server 150 through the gateway 131. Accordingly, the LPWAN interface 205 provides the information provided by the calling control unit 207 to the management server 150 and receives the information provided by the management server 150 to provide it to the calling control unit 207.

The calling control unit 207 controls the overall operation of the calling device 110 of the invention, specifically recognizes the caller's calling command, and requests the management server 150 to call the driver, and also receives a 'calling confirmation message' notifying that the driver confirms the calling from the management server 150 and displays it to the caller through the display unit 111.

The calling control unit 207 receives the telephone number of the driver from the management server 150 and stores it in advance and if an event (telephone number display event) occurs, allows the caller to make a call to the driver directly by displaying the pre-stored driver phone number on the display unit 111. The telephone number display event will be described below again.

The generation condition of the telephone number display event may be set in various ways and is provided entirely according to the control of the driver, that is, the control command provided by the driver terminal 170. In other words, since the driver terminal 170 is not able to directly connect with the calling device 110, the driver terminal 170 controls the phone number display event of the calling device 110 through the management server 150.

The main body 115 or the calling control unit 207 may be implemented to be operated at all times, but may be set to be operated only when the driver provides an operation specifically. In this case, the calling device 110 may further include a separate means (e.g., a switch) for receiving a control command for starting and ending the operation from the driver through a button (not shown) to provide it to the calling control unit 207.

Driver Calling Service of Calling Device

Hereinafter, the driver calling operation of the calling control unit 207 will be described in more detail with reference to FIG. 3. Hereinafter, for convenience of explanation, it is assumed that the calling detection sensor unit 113 is an impact detection sensor.

<Calling Command Recognition of Caller: S301>

When starting an operation, the calling device 110 waits for a calling command to be inputted through the calling detection sensor unit 113. The calling detection sensor unit 113 senses an impact occurring in the specific area A and provides it to the calling detection unit 203. If the calling detection unit 203 determines that an impact of a predetermined intensity or more is continuously inputted to the specific region A based on a signal provided by the calling detection sensor unit 113, it determines that the calling command of a caller is inputted.

<Calling Start of Calling Device According to Calling Command: S303, S305>

If it is confirmed in operation S301 that there is a calling command, the calling control unit 207 first transmits a calling message to the management server 150. The calling message includes a calling device identification number for identifying the calling device 110. The calling message transmission is performed as the LPWAN interface 205 converts the calling message into an LPWAN data packet and transmits it to the gateway 131 (S303).

After transmitting the calling message, the calling control unit 207 displays 'Calling The Driver Currently' through the display unit 111 (S305).

<Calling Message Reception and Driver Calling of Management Server: S307 to S311>

The gateway 131, which receives the calling message from the calling device 110, transmits a corresponding message to the LPWAN server 137 and the LPWAN server 137 transmits the message to the management server 150 (S307).

The management server 150 that receives the calling message confirms the driver by using the calling device identification number included in the calling message and extracts information on the driver terminal 170 from the corresponding driver information (S309).

The management server 150 transmits a calling message of a predetermined type to the driver terminal 170. If a dedicated messaging application is installed in the driver terminal 170, the management server 150 may provide a calling message in a form of providing predetermined information (S311).

<Calling Confirmation of Driver: S313>

The driver terminal 170 may display a calling message to the driver and determine whether the driver confirms the calling message. Such a method may be performed in various ways.

If a dedicated messaging application is installed in the driver terminal 170, it may be determined that the calling message is confirmed by manipulating a corresponding application or by responding to the request of an application that specifically requests the calling confirmation.

<Transmitting Calling Confirmation Message to Calling Device: S315 to S319>

When the driver confirms the calling message, the dedicated messaging application of the driver terminal 170 provides the calling confirmation message to the management server 150 (S315). The management server 150 delivers the calling confirmation message to the LPWAN server 137 and the LPWAN server 137 transmits the calling confirmation message to the gateway 131 again (S317) and the gateway 131 delivers it to the calling control unit 207 of the calling device 110 (S319).

<Displaying Driver Calling Confirmation State: S321>

When receiving the calling confirmation message from the management server 150, the calling control unit 207 displays a message for transmitting the 'driver calling confirmation' through the display unit 111.

Through the above method, the driver calling service of the calling device 110 of the invention is performed.

'Phone Number Display Event' of Calling Device

The driver may control the calling device 110 to display the driver's telephone number through the display unit 111 using the driver terminal 170. For this, it may be controlled that the calling phone number is provided to the calling device 110 in advance through the management server 150 to be stored.

Figure 3:
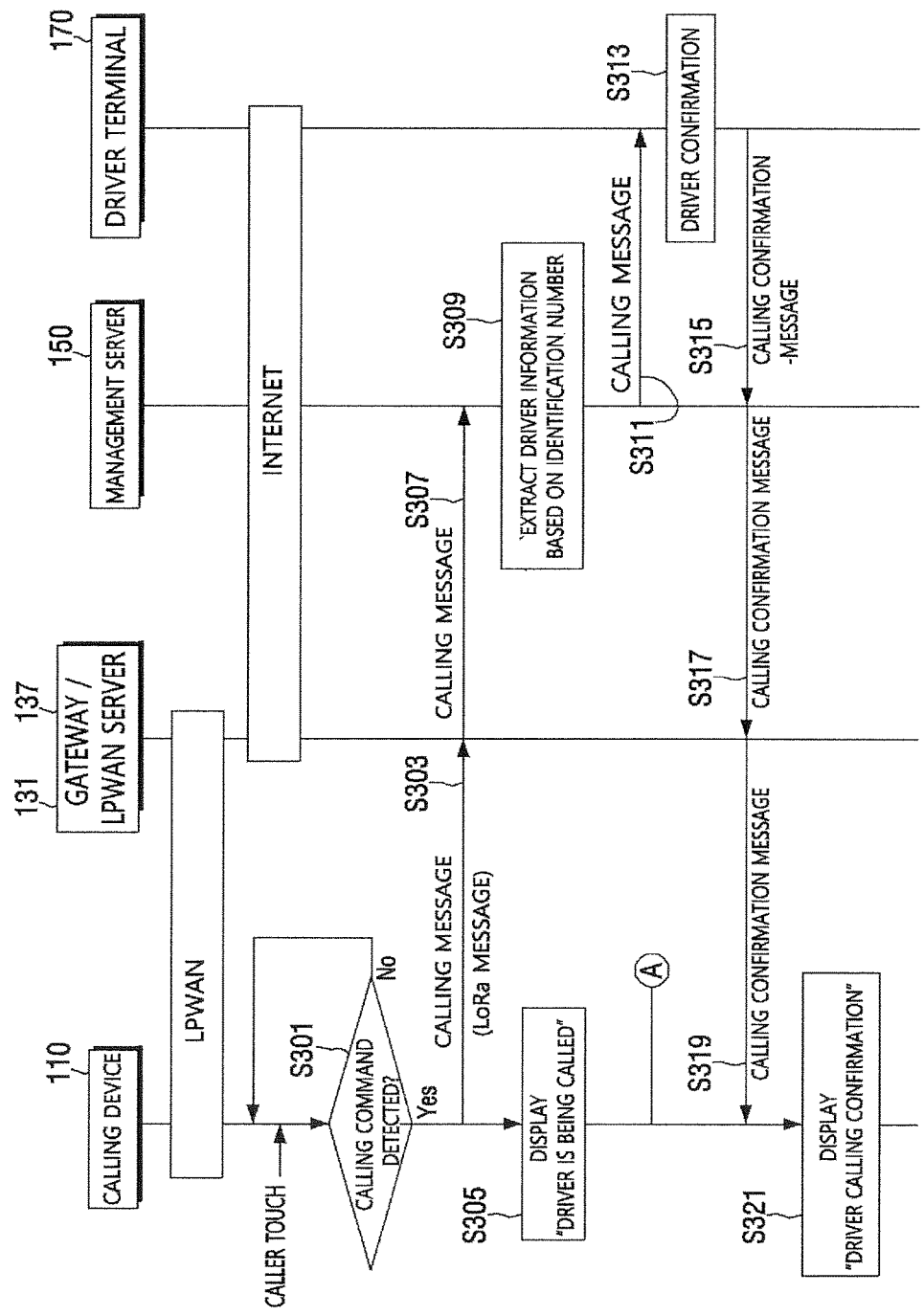
FIG. 3 and FIG. 4 are flowcharts provided for an operation description of a calling device according to an embodiment of the invention.

The telephone number display event is performed (1) when the driver controls the calling device 110 to display the telephone number first on the display unit 111 by using the driver terminal 170 without using the calling method of FIG. 3. The calling device 110 displays the telephone number without performing the process of FIG. 3 according to the control command of the driver. The driver control command is transmitted to the calling device 110 through the management server 150→the LPWAN server 137→the gateway 131, as described above.

(2) In the second method, when the vehicle 10 is located in the LPWAN shadow area and thus, the calling device 110 is not able to transmit the calling message of operation S303 to the gateway 131 while trying to call the driver through the method of FIG. 3, the calling control unit 207 controls the display unit 111 to preferentially display the driver's telephone number.

(3) In the third method, when the driver is called through the method of FIG. 3 but the driver is not able to confirm the calling, it is performed through a 'phone number display event' process of the calling device 110 described below with reference to FIG. 4.

Hereinafter, with reference to FIG. 4, the third method for processing the phone number display event will be described.

<Waiting for Calling Confirmation Message for Predetermined Time: S401 to S405>

The calling control unit 207, which performs operation S303 and operation S305, waits for the calling confirmation message of operation S319 from the gateway 131 for a predetermined time (i.e., a message confirmation waiting time). Upon receiving the calling confirmation message of operation S319 from the gateway 131 during the message confirmation waiting time, the calling control unit 207 performs operation S321 without performing the method of FIG. 4 (S401, S403).

During the message confirmation waiting time, the calling detection unit 203 waits for a new driver calling command of a caller by using the calling detection sensor unit 113 (S405).

Figure 4:
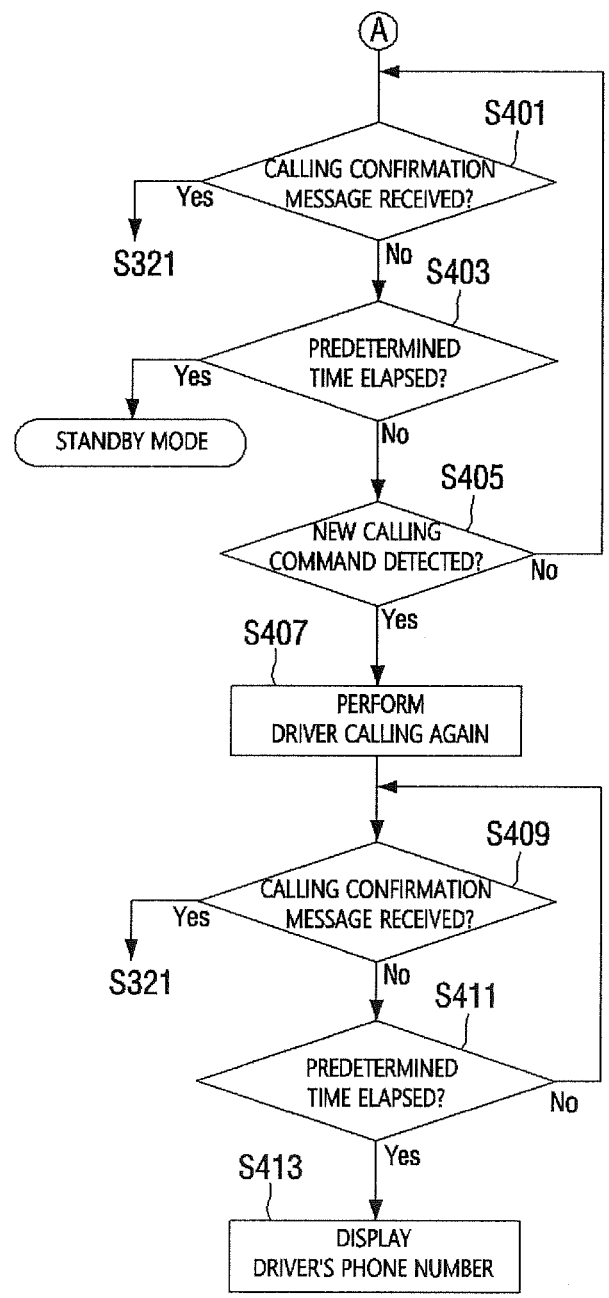

If the message confirmation waiting time is terminated without a new driver calling command of a caller, the calling control unit 207 proceeds to a standby mode, waits for operation S301 to proceed, and terminates the procedure of FIG. 4.

<Processing Caller's New Calling Command while Waiting for Message Confirmation: S407>

If the new driver calling command of the caller is inputted again during the message confirmation waiting time, the calling control unit 207 performs operation S303 and operation S305 again and transmits a calling message to the gateway 131 and waits.

<Phone Number Display Event after Repeated Calling: S409 to S413>

The calling control unit 207 waits for the calling confirmation message of operation S319 from the gateway 131 for a predetermined message confirmation waiting time. Upon receiving the calling confirmation message of operation S319 from the gateway 131 during the message confirmation waiting time, the calling control unit 207 performs operation S321 and terminates the procedure of FIG. 4 (S409, S411).

When the message confirmation waiting time is terminated without receiving the calling confirmation message, the calling control unit 207 performs the telephone number display event to display the pre-stored driver telephone number on the display unit 111 (S413).

Through the above method, the telephone number display event of the calling device 110 of the invention is performed.

The calling device of the invention may call a caller as the caller knocks a window portion of a vehicle. The calling device may display through a display unit that a caller is being called, and if a driver confirms the calling, its confirmation status may also be displayed so that a driver calling situation is immediately displayed to the caller.

On the other hand, when the driver does not confirm the calling despite the driver calling by the knocking of the caller, the calling device of the invention may display a previously stored driver's telephone number on the display unit. Also, even if the calling device is not able to transmit a driver calling request by the knocking of the caller to the management server as being located in the shaded area where a network connection is not established, the calling device displays the driver's phone number on the display unit to allow the caller to directly call the driver.

Since the calling device of the invention utilizes the LPWAN network, it may be operated at a low power and thus may operate the calling device for a long time even with a small power such as a battery. Since the communication cost of the LPWAN network itself is very low, the cost of operating the calling device may be kept very low.

Although various embodiments of the invention have been particularly shown and described, the invention is not limited to the above-mentioned specific embodiments and it should be understood by those skilled in the art that various modified embodiments are possible without departing from the technical idea and outlook of the invention.

What is claimed is:

1. A vehicle driver calling method of a driver calling device installed in a vehicle and configured to transmit/receive data to/from a management server through a Low Power Wide Area Network (LPWAN), the method comprising:

(a) receiving, by a calling detection unit of the calling device, a driver calling command from a caller by using a calling detection sensor installed at one side of the vehicle to detect an operation of the caller;

(b) adding, by a calling control unit of the calling device, a calling device identification number to the calling command to request the management server to transmit a calling message to the driver through the LPWAN, and displaying that the driver is being called through a display unit attached to the inside of a glass window of the vehicle;

(c) receiving, by the calling control unit, a calling confirmation message corresponding to the request of step (b) from the management server and displaying that the driver confirms the calling through the display unit, wherein the calling confirmation message is generated when the management server transmits the calling message to a driver terminal mapping to the calling device identification number and the driver confirms the calling message; and (d) if the calling control unit does not receive the calling confirmation message from the management server in correspondence to the request of step (b) within a predetermined time, displaying a pre-stored driver phone number on the display unit.

2. The method according to claim 1,
wherein step (d) comprises:
during the predetermined time, receiving, by the calling control unit, the driver calling command from the caller, performing step (b) again, and waiting for the calling confirmation message again for the predetermined time; and
if said waiting for the calling confirmation message is performed a predetermined number of times and the predetermined time is terminated without receiving the calling confirmation message, displaying the driver phone number on the display unit.

3. The method according to claim 1,
when the calling control unit does not transmit the request to the management server as located in an area where the management server is not connected through a network, further comprising displaying the driver phone number on the display unit.

4. The method according to claim 1,
if the calling control unit has a driver's phone number displaying command at the time of receiving the driver calling command, further comprising displaying the driver phone number through the display unit without performing step (b),
wherein the phone number displaying command is received by a dedicated messaging application of the driver terminal from a user and is provided to the management server and the management server provides the phone number displaying command to the calling control unit through the LPWAN.

5. A driver calling device installed in a vehicle and configured to transmit/receive data to/from a management server through a Low Power Wide Area Network (LPWAN), the device comprising:
a calling detection sensor unit configured to detect an operation of a caller by including an impact detection sensor for detecting a vehicle vibration according to tapping a specific area of the vehicle or a capacitive sensor for detecting a finger or palm of the caller contacting a specific area of the vehicle;
a calling detection unit configured to receive a driver calling command from the caller by using a detection signal of the calling detection sensor unit;
a display unit installed at the inside of a glass window of the vehicle to display various information to the caller;
an LPWAN interface connecting to the LPWAN through a wireless channel according to the LPWAN protocol; and
a calling control unit configured to transmit a calling message including a calling device identification number to the management server according to the calling command through the LPWAN interface and request the management server to deliver the calling message to the driver and display that the driver is being called on the display unit,
wherein when receiving a calling confirmation message notifying that a driver confirms the calling message from the management server, the calling control unit displays that the driver confirms the calling on the display unit, and if not receiving the calling confirmation message from the management server for a predetermined time, displays a pre-stored driver phone number on the display unit.

6. The device according to claim 5,
wherein the calling control unit receives the driver calling command again from the caller during the predetermined time to request the management server to call a driver again and waits for the calling confirmation message again for the predetermined time, and
if a process for waiting for the calling confirmation message again is repeated a predetermined number of times and the predetermined time is terminated without receiving the calling confirmation message, displays the driver phone number on the display unit.

* * * * *